(12) United States Patent
Mukai

(10) Patent No.: US 7,132,177 B2
(45) Date of Patent: Nov. 7, 2006

(54) MAGNETIC RECORDING MEDIUM AND FABRICATION METHOD THEREOF

(75) Inventor: Ryoichi Mukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/718,201

(22) Filed: Nov. 20, 2003

(65) Prior Publication Data
US 2004/0101716 A1   May 27, 2004

Related U.S. Application Data

(63) Continuation of application No. PCT/JP01/06014, filed on Jul. 11, 2001.

(51) Int. Cl.
*G11B 5/66* (2006.01)
*G11B 5/70* (2006.01)

(52) U.S. Cl. ................................. 428/831.2

(58) Field of Classification Search ........ 428/694 TM, 428/668, 611, 900, 694 TS, 831.2, 827, 831
See application file for complete search history.

(56) References Cited

U.S. PATENT DOCUMENTS

| | | | |
|---|---|---|---|
| 5,846,648 A * | 12/1998 | Chen et al. ................ | 428/332 |
| 6,119,483 A * | 9/2000 | Takahashi et al. ......... | 65/30.14 |
| 6,171,676 B1 | 1/2001 | Mukai et al. .............. | 428/65.3 |
| 6,177,208 B1 | 1/2001 | Yamamoto et al. ......... | 428/692 |
| 6,242,085 B1 * | 6/2001 | Ryonai et al. ............. | 428/332 |
| 2002/0160234 A1 * | 10/2002 | Sakawaki et al. ...... | 428/694 TS |

FOREIGN PATENT DOCUMENTS

| | | |
|---|---|---|
| JP | 62-270021 | 11/1987 |
| JP | 6-029121 | 2/1994 |
| JP | 09-016935 | 1/1997 |
| JP | 09-259425 | 10/1997 |
| JP | 11-154320 | 6/1998 |
| JP | 10-302242 | 11/1998 |
| JP | 2000-268340 | 9/2000 |
| JP | 2000-322726 | 11/2000 |
| JP | 2001-126239 | 5/2001 |

* cited by examiner

*Primary Examiner*—Holly Rickman
(74) *Attorney, Agent, or Firm*—Greer, Burns & Crain, Ltd

(57) ABSTRACT

A magnetic recording medium includes an underlayer formed on a substrate and a magnetic layer formed by epitaxial growth on the underlayer. The underlayer is made of Cr based substance, and the magnetic layer is made of Co based magnetic substance. The magnetic layer further includes a plurality of layers, each made of Co based alloy including at least one of oxide and nitride as additional content.

7 Claims, 5 Drawing Sheets

FIG.1

DEPOSITION OF
NUCLEATION SITE
LAYER 18 FOR
UNDERLAYER

FIG.2A

FORMING ISLANDS
BY HEAT TREATMENT

FIG.2B (COOLING)

FIG.2C

DEPOSITION OF
UNDERLAYER 12

FIG.2D

DEPOSITION OF
MAGNETIC LAYERS
13 AND 14

FIG.2E

DEPOSITION OF
Cr CAP 19

▼

POST ANNEALING

MAGNETIC RECORDING MEDIUM AND FABRICATION METHOD THEREOF

CROSS-REFERENCES TO RELATED APPLICATIONS

This application is a continuation application of International Application No. PCT/JP01/06014 filed on Jul. 11, 2001.

BACKGROUND OF THE INVENTION

1. Field of the Invention

The present invention generally relates to a magnetic recording medium that is built in a magnetic recording apparatus such as a hard disk drive. The present invention more particularly relates to a magnetic recording medium of which magnetic grains of a magnetic recording layer are prevented from expanding during epitaxial growth on an underlayer.

2. Description of the Related Art

A magnetic recording apparatus is an apparatus for recording a large amount of digital signals at low cost per bit. The magnetic recording apparatuses are widely used as secondary storage devices of personal computers.

The demand for the magnetic recording apparatuses for recording TV programs at home is expected to soar in conjunction with the start of digital television broadcasting in the near future. The capacity of the magnetic recording apparatus needs to be further increased for recording video signals of television. Cost per bit also needs to be reduced for consumer use.

The recording density of a magnetic recording medium needs to be increased because of the above reasons. It is an important object that, as the recording area for a bit is reduced, the size of magnetic grains needs to be reduced and made uniform, and the noise also needs to be reduced.

To achieve this object, a magnetic recording layer needs to be formed by cumulating fine magnetic grains the crystal axes of which are controlled, and a magnetic recording medium having such a magnetic recording layer needs to be fabricated.

However, a magnetic recording medium fabricated in a conventional general fabrication process is a structure in which polycrystalline layers are laminated by forming an underlayer and a magnetic recording layer in this order. The magnetic grains are cumulated on crystal grains of the underlayer without enough epitaxial growth in this fabrication process. A method is proposed in which magnetic grains are made fine by adding substance for adjusting grain diameter such as B and Ta.

However, if a magnetic layer is formed by sufficient (substantially complete) epitaxial growth in the deposition of magnetic grains on the underlayer, the aforementioned method in which magnetic grains are made small by adding substance such as B and Ta is unusable.

Accordingly, the underlayer needs to be finely grained first. The magnetic layer is formed on the fine-grained underlayer by the deposition of magnetic grains by sufficient epitaxial growth. This is, however, an indirect method.

The aforementioned indirect method causes a problem such that, since magnetic grains grow three dimensionally during the deposition on the underlayer, a crystal face with great lattice constant grows antecedently, and the magnetic grains become too large. Especially, this problem becomes apparent as the degree of vacuum of sputtering apparatuses is increased so as to promote epitaxial growth of layers. Noise needs to be reduced in addition to preventing the magnetic grains from expanding.

Accordingly, it is an object of the present invention to provide a magnetic recording medium in which magnetic grains forming a magnetic layer are prevented from expanding in the deposition of the magnetic grains on an underlayer by epitaxial growth, and as a result, the recording density of the magnetic recording medium is increased. Another object of the present invention is to provide a magnetic recording medium of which noise is further reduced.

SUMMARY OF THE INVENTION

The inventor has discovered that the growth of magnetic grains is controllable by adding oxide or nitride to magnetic substance, and as a result, the aforementioned problem that magnetic grains becomes too large in the deposition by sufficient epitaxial growth of the magnetic grains on a fine-grained underlayer is solved. The present invention is based on this discovery.

That is, the aforementioned problem is solved by using magnetic compound at least as a part of the magnetic layer, the magnetic compound being Co-based alloy with additional oxide or nitride.

The inventor has also confirmed that the above magnetic compound limits the move of chromium that segregates at grain boundaries and promotes the isolation of grains. The inventor invented a method of reducing noise of a magnetic recording medium based on this discovery.

The above objects are achieved, as described in claim 1, by a magnetic recording medium, including: an underlayer formed on a substrate, the underlayer being made of Cr based substance; and a magnetic layer formed by epitaxial growth on said underlayer, the magnetic layer being made of Co based magnetic substance; wherein said magnetic layer further includes a plurality of layers, each made of Co based alloy including at least one of oxide and nitride as additional content.

According to the invention described in claim 1, the oxide and nitride prevent the magnetic grains of the magnetic layer from expanding. According to this function, if the underlayer is finely grained, fine-grained magnetic grains having a predetermined crystal axis orientation are deposited on the fine grains of the underlayer. The magnetic grains do not expand. Accordingly, magnetic recording media of high recording density are provided. The composition of the oxide and nitride in the magnetic layers is preferably about 10 atomic % (at %). The effect of preventing the magnetic grains from expanding becomes more apparent as the composition of the oxide and nitride increases. However, if the composition is too high, the signal output of the magnetic recording medium is reduced. The epitaxial growth of the magnetic grains is also reduced.

Since a plurality of magnetic layers are formed, each layer becomes thinner than a conventional magnetic layer, which prevents the magnetic grains from expanding.

The above objects may be achieved, as described in claim 2, by a magnetic recording medium, including: an underlayer formed on a substrate, the underlayer made of Cr based substance; and a magnetic layer formed by epitaxial growth on said underlayer, the magnetic layer made of Co based magnetic substance; wherein said magnetic layer further includes: a first magnetic layer made of Co based alloy including at least one of oxide and nitride as additional content; and a second magnetic layer made of Co based alloy, the second magnetic layer formed on the first magnetic layer.

As described in claim 2, a portion of the magnetic layer may be made of a mixture of Co based magnetic substance and oxide or nitride. The oxide and nitride prevent magnetic grains from expanding. According to this arrangement, if the underlayer is finely grained, the magnetic grains formed thereon do not expand, and consequently, a finely grained magnetic layer having a predetermined crystallographic axis is formed.

Further, the first magnetic layer may include a plurality of layers of the mixture.

A Chromium layer formed on the magnetic layer ensures the segregation of chromium in grain boundaries of the magnetic layer thereby to lower noise.

The Co based alloy including oxide as additional content is a member selected from the group consisting of CoPt alloy—$SiO_2$, CoPt based alloy—$SiO_2$, CoPt alloy—$Al_2O_3$, and CoPt based alloy—$Al_2O_3$. The Co based alloy including nitride as additional content is a member selected from the group consisting of CoPt alloy—$Si_3N_4$ and CoPt based alloy—$Si_3N_4$.

The Co based alloy may be CoCrPt including chromium. Chromium in magnetic grains precipitates in the grain boundaries.

The above objects may be achieved, as described in claim 7, by a method of fabricating a magnetic recording medium, including the steps of: forming an underlayer on a substrate by depositing Cr based substance and a plurality of magnetic layers on the underlayer, each magnetic layer formed by depositing Co based alloy including at least one of oxide and nitride as additional content by epitaxial growth, a composition of the Co based alloy being different from one another, wherein no heat and bias voltage are provided to the substrate; and heating the substrate thereby to promote segregation of chromium in grain boundaries of the plurality of magnetic layers.

The above objects may be achieved, as described in claim 8, by a method of fabricating a magnetic recording medium, including the steps of: forming an underlayer on a substrate by depositing Cr based substance, at least one first magnetic layer on the underlayer by depositing Co based alloy including at least one of oxide and nitride as additional content by epitaxial growth, and a second magnetic layer on the first magnetic layer by depositing Co based alloy including neither oxide nor nitride as additional content, wherein no heat and bias voltage are provided to the substrate; and heating the substrate thereby to promote segregation of chromium in grain boundaries of the magnetic layers.

According to the inventions described in claims 7 and 8, a magnetic recording medium can be fabricated in which magnetic grains forming a magnetic layer are prevented from expanding during epitaxial growth on an underlayer thereby to increase the recording density of the magnetic recording medium, and additionally, to reduce noise thereof.

The method may include the step of forming a Cr layer on the magnetic layer by depositing chromium before the step of heating the substrate.

It is preferable that each step is performed in vacuum in which exposure to residual gas is less than 0.6 langmuir.

If the step of forming a nucleation site layer of island structure thereby to finely grain the underlayer before the step of forming the underlayer is included, the crystal of the underlayer may be improved. The magnetic layers can be formed by RF sputtering method.

It is possible to provide a magnetic recording medium of high recording density and low noise in which the above magnetic recording medium is built.

DETAILED DESCRIPTION OF THE PREFERRED EMBODIMENTS

Preferred embodiments of the present invention are described below with reference to drawings.

First Embodiment

Figure 1:
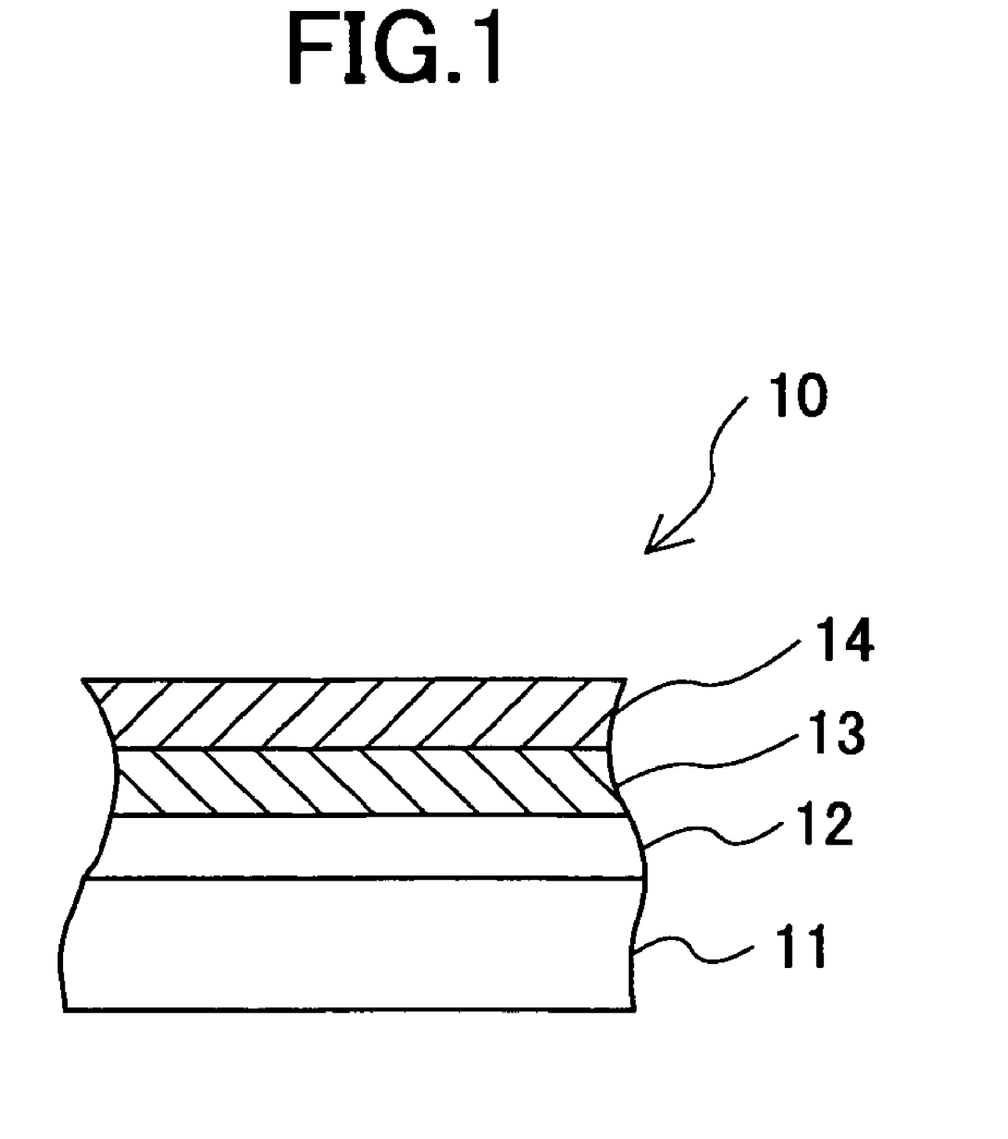
FIG. 1 is a schematic diagram showing the structure of a magnetic recording medium according to a first embodiment.

FIG. 1 is a schematic diagram showing the layered structure of a magnetic recording medium according to a first embodiment.

The magnetic recording medium 10 according to the first embodiment includes a substrate 11, a chromium based underlayer 12 formed on the substrate 11, and a magnetic layers 13 and 14 formed on the underlayer 12. The magnetic layer of the magnetic recording medium 10 includes a plurality of magnetic layers.

Each magnetic layer 13 and 14 is formed by depositing a mixture of Co based alloy and at least one of oxide and nitride by sufficient epitaxial growth on the underlayer 12. Since at least one of oxide and nitride is added to the Co based alloy, magnetic grains of the magnetic layers 13 and 14 are prevented from expanding.

The oxide may be $SiO_2$ and $Al_2O_3$, for example. The nitride may be $Si_3N_4$, for example.

The Co based alloy of the magnetic layers 13 and 14 may be any magnetic substance known in the art. For example, CoPt alloy and CoPt based alloy, that is, CoPt alloy including another metallic substance, are usable. An example of the CoPt based alloy is CoCrPt.

Oxide or nitride is added to the Co based alloy for forming the magnetic layer 13 and 14. Mixtures including oxide may be CoPt alloy—$SiO_2$, CoPt based alloy—$SiO_2$, CoPt alloy—$Al_2O_3$, and CoPt based alloy—$Al_2O_3$, for example. Mixtures including nitride may be CoPt alloy—$Si_3N_4$ and CoPt based alloy—$Si_3N_4$, for example.

The magnetic layers 13 and 14 may be made of different mixtures. Alternatively, the magnetic layers 13 and 14 may be made of mixtures including the same contents at different content ratio.

The content ratio of the oxide and nitride is not necessarily limited, but is not as high as that of a granular film of which content ratio of the oxide or nitride is about 50 at %. The content ratio is about 10 at %, for example.

The content ratio of the oxide and nitride in the mixture is preferably 10 at %, and more preferably about 5 at %.

It is preferable that the content ratio of oxide or nitride in the magnetic layers 13 and 14 is different from each other.

Meanwhile, since a plurality of magnetic layers are formed in the magnetic recording medium 10 according to the first embodiment, the thickness of each magnetic layer may be thinner than that of a single magnetic layer in the case in which only the single magnetic layer is formed. As a result of forming a plurality of thin magnetic layers, the growth of magnetic grains deposited by epitaxial growth is limited. Accordingly, the forming of a plurality of magnetic layers further prevents the magnetic grains from expanding.

Figure 2A:
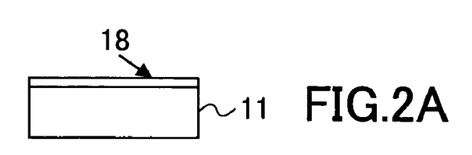
FIGS. 2A through 2E are schematic diagrams showing fabrication process of the magnetic recording medium according to the first embodiment.
Figure 2B:
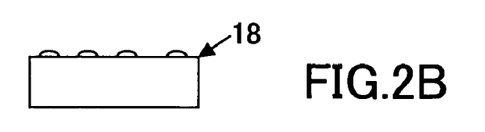
Figure 2C:
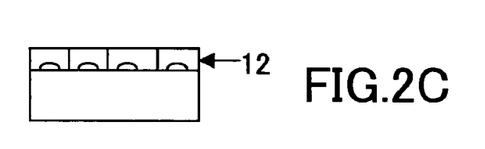
Figure 2D:
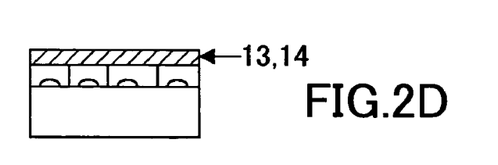
Figure 2E:
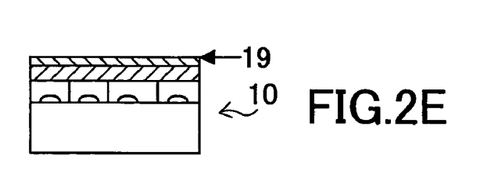

Referring to FIGS. 2A–2E, the fabrication process of the magnetic recording medium 10 is described below. In order to show a more preferable embodiment, FIG. 2A shows a step of forming a nucleation site layer thereby to finely grain the underlayer. FIG. 2E further shows steps after the forming of the basic structure of the magnetic recording medium. The steps include a step of forming a Cr cap layer thereby to promote the isolation of magnetic grains and to reduce noise, and a subsequent step of promoting Cr segregation in the magnetic grain boundaries by post annealing.

In FIGS. 2A–2E, elements corresponding to those shown in FIG. 1 are referred to by the same reference numerals.

As pre-processing, a nucleation site layer 18 is formed thereby to make the Cr underlayer 12 formed on the substrate 11 finely grained. Additionally, as post-processing, post annealing is performed thereby to promote Cr segregation in magnetic grain boundaries and to reduce noise.

A description is made with reference to FIGS. 2A–2E. The Si disk substrate 11 on which an amorphous $SiO_2$ film 11 is formed is set on a vacuated RF sputtering apparatus (not shown). The layers 12, 13, 14, and 19 are deposited by epitaxial growth in the RF sputtering apparatus.

It is preferable that steps described below are performed in vacuum in which the exposure of the substrate 11 to residual gas does not exceed 0.6 langmuir.

The surface of the substrate 11 is covered with gas naturally absorbed while the substrate 11 is placed in air. As shown in FIG. 2A, a 1 nm thick $Co_{90}Pt_{10}$ film is deposited on the substrate 11 as it is. Then, as shown in FIG. 2B, the substrate 11 is heated at about 350° C. thereby to nucleate the $Co_{90}Pt_{10}$ film into islands and to form nucleation site layer (NSL) 18.

After sufficiently cooling the substrate, an about 19 nm thick Cr underlayer 12 is formed as shown in FIG. 2C. Since the Cr underlayer 12 is deposited on the islands of NSL 18 as the nuclei of grains, the Cr underlayer 12 is preferably finely grained.

Then, as shown in FIG. 2D, two magnetic layers 13 and 14 are deposited in this order.

The first magnetic layer 13 is made of $(Co_{88}Pt_{12})_{90}$—$(SiO_2)_{10}$ or $(Co_{88}Pt_{12})_{90}$—$(Si_3N_4)_{10}$. The second magnetic layer 14 is made of $(Co_{88}Pt_{12})_{95}$—$(SiO_2)_5$ or $(Co_{88}Pt_{12})_{95}$—$(Si_3N_4)_5$. Total thickness of the two magnetic layers 13 and 14 is about 11 nm.

Furthermore, as shown in FIG. 2E, an about 1.6 nm thick Cr film (Cr-Cap) is deposited. The basic structure of the magnetic recording medium 10 is completed at this step.

Although not shown in FIGS. 2A–2E, the magnetic recording medium 10 is post-annealed (heated) at 350° C. thereby to deposit an about 3 nm thick C film (protective coating). The fabrication of the magnetic recording medium 10 is then completed.

The magnetic recording medium 10 as fabricated as above is highly sensitive medium with low transition noise since the magnetic grains are prevented from expanding. Additionally, the move of Cr to grain boundaries and promote segregation, the magnetic grains are isolated from each other and noise is reduced.

In addition, the inventor observed magnetic grains of a magnetic recording medium in which two magnetic layers made of CoPt alloy without additional oxide or nitride and magnetic grains of a magnetic recording medium in which a magnetic layer made of CoPt alloy without additional oxide or nitride, and confirmed that the observed magnetic grains are expanded. According to the expansion of the magnetic grains, the magnetic layer made of Co based alloy without oxide and nitride causes transition noise, and its S/Nm ratio, which is an important property of the magnetic recording medium, is degraded.

In the above embodiment, no heat or bias is provided to the substrate at each step of forming a layer, but the substrate is post-annealed. However, even if the substrate is heated and biased, instead of being post-annealed, the magnetic grains can be prevented from expanding and the properties of the magnetic recording medium can be improved.

Second Embodiment

A magnetic recording medium according to a second embodiment includes at least one magnetic layer (a first magnetic layer) including oxide or nitride as additional content, and a magnetic layer (a second magnetic layer) including no oxide and nitride.

Figure 3:
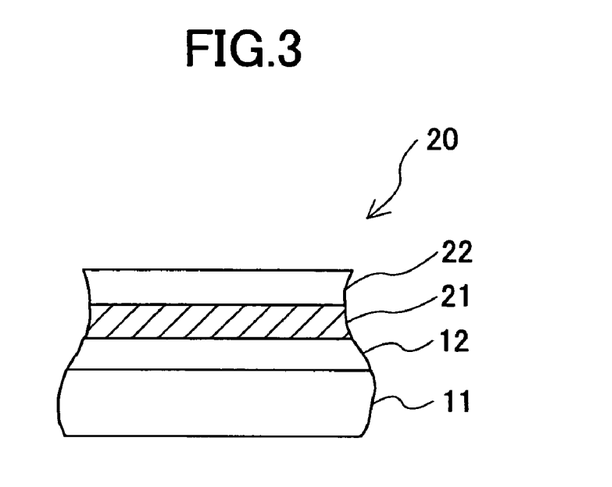
FIG. 3 is a schematic diagram showing a structure of a magnetic recording medium according to a second embodiment.
Figure 4:
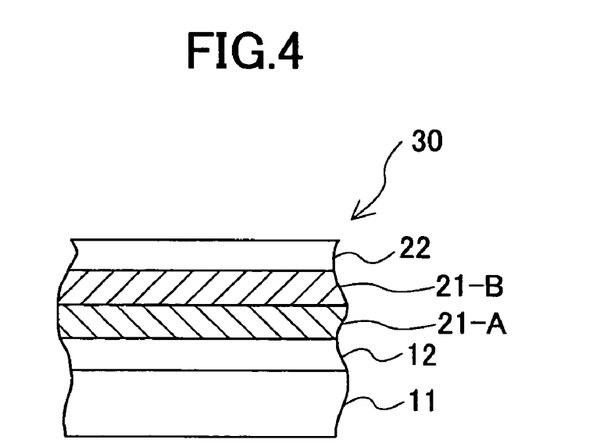
FIG. 4 is a schematic diagram showing another structure of the magnetic recording medium according to the second embodiment.

FIGS. 3 and 4 are schematic diagrams showing the layer structure of the magnetic recording medium 20 and 30 according to the second embodiment. Elements identical to those of the first embodiment shown in FIG. 1 are referred to by the same reference numerals.

FIG. 3 shows the magnetic recording medium 20 including a first magnetic layer 21 including oxide or nitride as additional content therein and a second magnetic layer 22 including no oxide and nitride.

FIG. 4 shows the magnetic recording medium 30 including a plurality of first magnetic layers 21 including oxide or nitride as additional content and a second magnetic layer 22 including no oxide and nitride. FIG. 4 shows the case in which two first magnetic layers 21-A and 21-B are formed.

The first magnetic layer 21 is made of Co based alloy including oxide or nitride as additional content as the magnetic layers 13 and 14 according to the first embodiment are. Whereas, the second magnetic layer 22 is made of Co based alloy including no oxide and nitride such as CoPt alloy and CoPt based alloy that is CoPt alloy including another metal substance. CoPt based alloy may be CoCrPt, for example.

In the case of the magnetic recording medium 20 and 30, a portion of the magnetic layer is made of magnetic substance including oxide or nitride as additional content, the magnetic grains are prevented from expanding thereby to reduce transition noise.

The first magnetic layer 21 including oxide or nitride as additional content slightly prevents Cr from segregating in grain boundaries during the post-annealing. Accordingly, the first magnetic layer 21 tends to prevent the effect of the Cr segregation in which magnetic interaction between magnetic grains is reduced and the magnetic grains are isolated from each other.

The second magnetic layer does not include oxide and nitride, and as a result, magnetic grains of the second magnetic layer tend to expand. However, the magnetic layer includes a plurality of layers. The second magnetic layer is thinner than a conventional magnetic layer. Accordingly, the magnetic layers therein do not expand.

The magnetic recording medium 20 and 30 according to this embodiment can be fabricated in the same manner as shown in FIG. 2. Since a Cr cap is formed on the top of the magnetic recording medium 20 and 30, Cr is segregated in the grain boundaries of the magnetic grains thereby to reduce noise.

Figure 5:
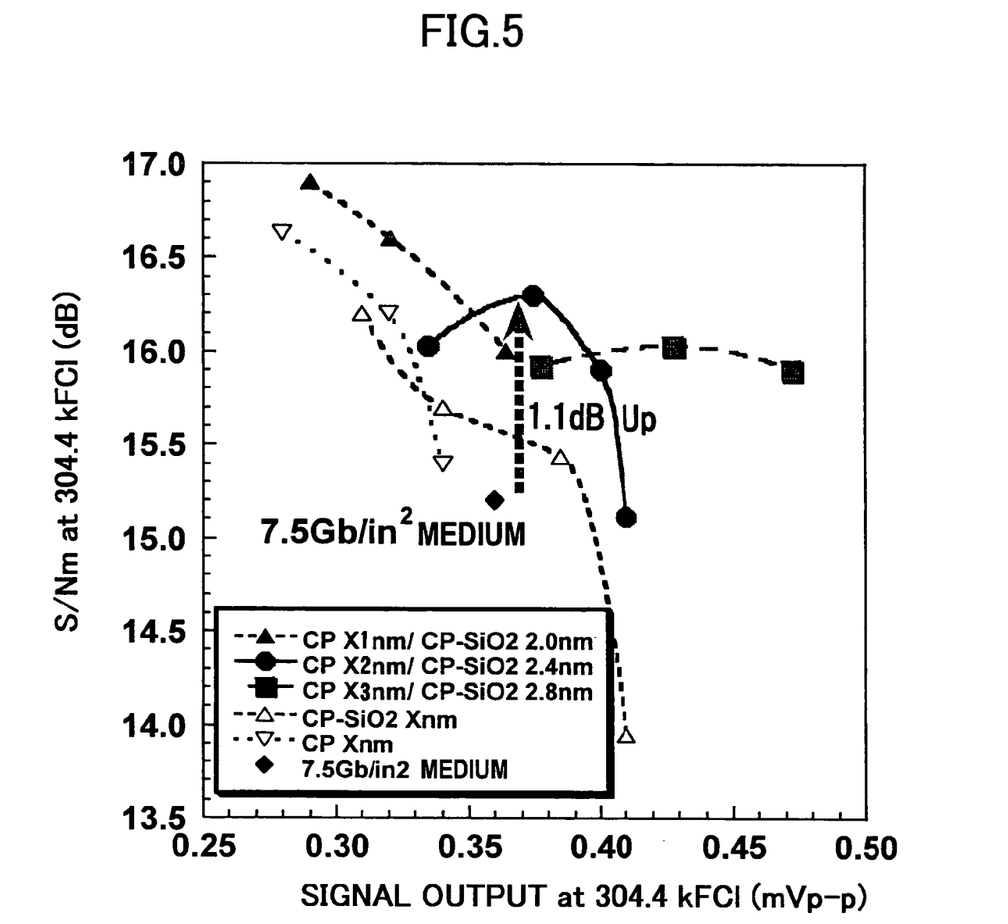
FIG. 5 is a graph showing experimental results in which S/Nm is compared for some signal outputs by changing the thickness of a magnetic layer of the magnetic recording medium according to the second embodiment.

FIG. 5 is a graph of S/Nm of a magnetic recording medium including both a magnetic layer including oxide or nitride (CoPt—$SiO_2$, for example) and a magnetic layer including neither oxide nor nitride (CoPt, for example) like the magnetic recording medium 20 according to the second embodiment shown in FIG. 3. FIG. 5 shows the result of each sample having either 2.0 nm, 2.4 nm, or 2.8 nm thick first magnetic layer made of $(Co_{88}Pt_{12})_{95}$—$(SiO_2)_5$, and a second magnetic layer made of $Co_{90}Pt_{10}$ of which thickness $X_1$–$X_3$ varies in a range between 2.4 and 4.2 nm. Various layered structures each having a magnetic layer of different thickness is formed thereby to form magnetic recording media of different signal output, and their S/Nm are compared.

FIG. 5 shows that, when the magnetic layer is thick, the addition of oxide or nitride is apparently advantageous.

FIG. 5 shows that the magnetic recording medium according to this embodiment is higher in S/Nm than a conventional magnetic recording medium having a magnetic layer including neither oxide nor nitride and a magnetic recording medium having only one magnetic layer including oxide or nitride as additional content. It is noted that the thicker is the magnetic layer, the more apparent becomes the expansion of magnetic grains of a magnetic layer including neither oxide nor nitride, and to the contrary, the more apparent becomes the effect of oxide or nitride added to the magnetic layer to prevent magnetic grains thereof from expanding.

The above results shows the effectiveness of the magnetic recording medium according to the second embodiment having the first magnetic layer including oxide or nitride and the second magnetic layer formed on the first magnetic layer, the second magnetic layer including neither oxide nor nitride.

In the case of a magnetic recording medium according to the first and second embodiments, the higher is the content ratio of oxide or nitride, the more apparent is the effect of preventing magnetic grains of the magnetic layer from expanding. If the content ratio becomes too great, a tendency that the signal output per the unit thickness of magnetic layer is reduced emerges. This reduction of signal output may become a drawback to high density recording. This drawback may be effectively reduced by forming a plurality of magnetic layers each made of CoPt alloy including a different content ratio of oxide or nitride.

Figure 6:
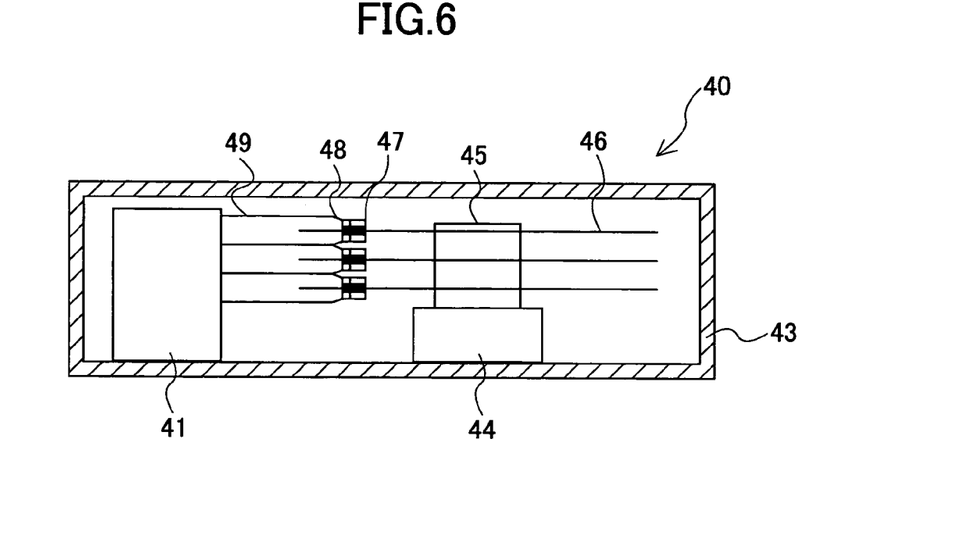
FIG. 6 is a sectional view showing an exemplary magnetic recording apparatus.
Figure 7:
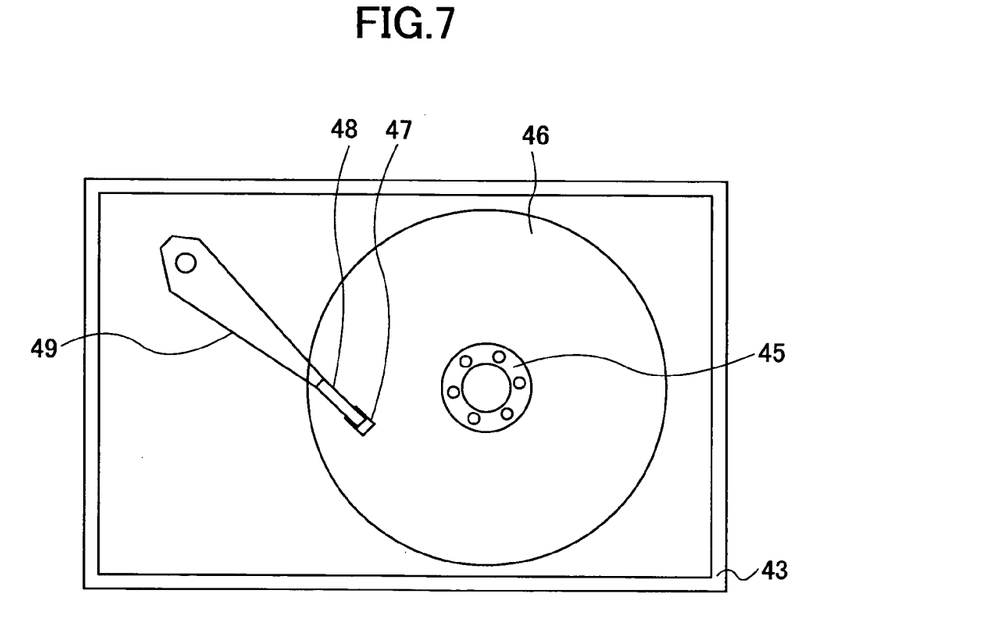
FIG. 7 is a top view of the magnetic recording apparatus shown in FIG. 6.

FIGS. 6 and 7 show an exemplary magnetic recording apparatus in which the magnetic recording medium is built. FIG. 6 is a sectional view of the magnetic recording apparatus 40, and FIG. 7 is a plan view of the magnetic recording apparatus 40.

As shown in FIGS. 6 and 7, the magnetic recording apparatus 40 includes a housing 43, and further includes a motor 44, a hub 45, a plurality of magnetic recording media 46, a plurality of read/write heads 47, a plurality of suspensions 48, a plurality of arms 49, and an actuator unit 41 stored in the housing 43. The magnetic recording media 46 are attached to the hub 45 that is rotated by the motor 44. Each read/write head 47 is a composite head including a read head such as an MR head and a GMR head, and a write head such as an inductive head. Each read/write head 47 is attached to the end of corresponding arm 49 via a suspension 48. The arm 49 is actuated by the actuator unit 49. The basic structure of this magnetic recording apparatus 40 is well known, and accordingly, the detailed description of the magnetic recording apparatus 40 is omitted.

The magnetic recording apparatus 40 according to the embodiment is characterized by the magnetic recording medium 46. Each magnetic recording medium 46 is structured as described with reference to FIGS. 1 through 3. The number of magnetic recording media 46 is not limited to three. One, two, four, or more magnetic recording media 46 may be built in the magnetic recording apparatus 46.

The basic structure of the magnetic recording apparatus 40 is not limited to that shown in FIGS. 6 and 7. The magnetic recording medium 46 that is built in the magnetic recording apparatus 40 according to this embodiment is not limited to a magnetic disk.

The present invention is not limited to the specifically disclosed embodiments, and variations and modifications may be made without departing from the scope of the present invention.

As is apparent from the above detailed description, a magnetic recording medium according to the present invention includes magnetic layers formed on a fine-grained underlayer by depositing magnetic grains by substantially complete epitaxial growth. The magnetic recording medium solves the problem that the deposited magnetic grains expand. The magnetic recording medium realizes the increase in recording density. As a result, the S/N ratio of the magnetic recording medium is improved.

What is claimed is:

1. A magnetic recording medium, comprising:
   a first layer including a plurality of islands formed on the substrate;
   an underlayer formed on the first layer, the underlayer being made of Cr based substance that separates said islands from each other; and
   a magnetic layer formed by epitaxial growth on said underlayer, the magnetic layer being made of Co based magnetic substance;
   wherein said magnetic layer further comprises a plurality of layers, each made of Co based alloy including at least one of oxide and nitride as additional content.

2. A magnetic recording medium, comprising:
   a first layer including a plurality of islands formed on the substrate;
   an underlayer formed on the first layer, the underlayer being made of Cr based substance that separates said islands from each other; and
   a magnetic layer formed by epitaxial growth on said underlayer, the magnetic layer being made of Co based magnetic substance;
   wherein said magnetic layer further comprises:
   a first magnetic layer made of Co based alloy including at least one of oxide and nitride as an additional content; and
   a second magnetic layer made of Co based alloy, the second magnetic layer being formed on the first magnetic layer.

3. The magnetic recording medium as claimed in claim 2, wherein the first magnetic layer further comprises a plurality of layers, each made of Co based alloy including at least one of oxide and nitride as an additional content.

4. The magnetic recording medium as claimed in claim 1, further comprising:
   at least one of Cr layer and Cr based alloy layer formed on said magnetic layer.

5. The magnetic recording medium as claimed in claim 1, wherein the Co based alloy including oxide as an additional content is a member selected from the group consisting of CoPt alloy—$SiO_2$ and CoPt alloy—$Al_2O_3$.

6. The magnetic recording medium as claimed in claim 1, wherein the Co based alloy including nitride as an additional content comprises CoPt alloy—$Si_3N_4$.

7. A magnetic recording apparatus, comprising:
a magnetic recording medium including;
a first layer including a plurality of islands formed on the substrate,
an underlayer formed on the first layer, the underlayer being made of Cr based substance that separates said islands from each other; and
a magnetic layer formed by epitaxial growth on said underlayer, the magnetic layer being made of Co based magnetic substance;
wherein said magnetic layer further comprises a plurality of layers, each made of Co based alloy including at least one of oxide and nitride as an additional content.

* * * * *